United States Patent
Brown et al.

(10) Patent No.: US 9,898,932 B2
(45) Date of Patent: Feb. 20, 2018

(54) UNMANNED VEHICLE MOVEMENT PATH ASSIGNMENT AND MANAGEMENT

(71) Applicant: International Business Machines Corporation, Armonk, NY (US)

(72) Inventors: Jay A. Brown, Long Beach, CA (US); Thomas J. Watson, Riverside, CA (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 14/703,062

(22) Filed: May 4, 2015

(65) Prior Publication Data

US 2016/0327959 A1 Nov. 10, 2016

(51) Int. Cl.
*G08G 5/00* (2006.01)
*G05D 1/02* (2006.01)
*G05D 1/10* (2006.01)

(52) U.S. Cl.
CPC ......... *G08G 5/0069* (2013.01); *G05D 1/0202* (2013.01); *G05D 1/104* (2013.01); *G08G 5/0013* (2013.01); *G08G 5/0034* (2013.01); *G08G 5/0039* (2013.01); *G08G 5/0052* (2013.01); *G08G 5/0082* (2013.01); *G08G 5/0086* (2013.01); *G08G 5/0091* (2013.01)

(58) Field of Classification Search
CPC .... G05D 1/101; G05D 1/0088; G05D 1/0055; G05D 1/0027; G05D 1/0022; G05D 1/0011; G08G 5/0069; G08G 5/006; G08G 5/0073; G08G 5/003
See application file for complete search history.

(56) References Cited

U.S. PATENT DOCUMENTS

| 8,718,838 | B2 | 5/2014 | Kokkeby et al. |
| 2007/0250260 | A1 | 10/2007 | Ariyur et al. |
| 2010/0250022 | A1 | 9/2010 | Hines et al. |
| 2016/0093218 | A1* | 3/2016 | Hale ............ G08G 5/003 701/120 |

(Continued)

OTHER PUBLICATIONS

Phantom Pilots, "Preventing & Recovering a Phantom from a fly away". Published Dec. 18, 2013.*

(Continued)

*Primary Examiner* — Mussa A Shaawat
*Assistant Examiner* — Michael Kerrigan
(74) *Attorney, Agent, or Firm* — Stephen J. Walder, Jr.; David B. Woycechowsky (57) ABSTRACT

Mechanisms are provided for monitoring an area utilizing an unmanned vehicle. These mechanisms identify an area to be monitored by an unmanned vehicle and identify an unmanned vehicle assigned to monitoring the identified area. The mechanisms further generate, for the unmanned vehicle, a travel path to be traversed by the unmanned vehicle using a function to randomize generation of the travel path. Moreover, the mechanisms program the unmanned vehicle to traverse the generated travel path and initiate operation of the unmanned vehicle to collect data about the area while traversing the generated travel path. In addition, the mechanisms monitor the area utilizing the unmanned vehicle based on the data collected by the unmanned vehicle while traversing the generated travel path.

20 Claims, 4 Drawing Sheets

(56) References Cited

U.S. PATENT DOCUMENTS

2016/0282861 A1* 9/2016 Golden ................ G05D 1/0011

OTHER PUBLICATIONS

"Northeast Search and Rescue", Accessed online Apr. 9, 2015, 2 pages.
"SkySquirrel technologies", Accessed online Apr. 9, 2015, 4 pages.
Bernardini, Sara et al., "Planning the Behaviour of Low-Cost Quadcopters for Surveillance Missions", Proceedings of the Twenty-Fourth International Conference on Automated Planning and Scheduling, Jun. 21-26, 2014, pp. 445-453.
Mottola, Luca et al., "Team-level Programming of Drone Sensor Networks", 12th ACM Conference on Embedded Networked Sensor Systems (SenSys'14), Nov. 3-5, 2014, 14 pages.

* cited by examiner

UNMANNED VEHICLE MOVEMENT PATH ASSIGNMENT AND MANAGEMENT

BACKGROUND

The present application relates generally to an improved data processing apparatus and method and more specifically to mechanisms for assigning and managing movement paths to unmanned vehicles.

The use of unmanned aircraft, also referred to as "drones," has primarily been limited to military applications until recently. Such drones tend to be remotely guided aircraft that are flown by a remotely located human pilot operating controls at a command center. The drone receives commands from the pilot via wireless communications and supplies various sensor information back to the pilot, e.g., camera images, radar information, audio information, and the like. While the drone itself is unmanned, the flying of the drone requires a human pilot to be able to provide commands to the drone. One example of such a drone aircraft is the MQ-9 Reaper available from General Atomics Aeronautical Systems.

As the cost of such drone aircraft decreases additional commercial uses have been developed for such aircraft. Recently, drones have been more popular for home and business use, both in terms of entertainment and business utility. For example, the large on-line electronic commerce retailer, Amazon™, has recently been approved by the United States government to test the use of drones to assist with deliveries of their goods to customers. Moreover, drones have been developed for entertainment use by providing aerial photograph capabilities. One example drone aircraft developed for commercial and recreational use for purposes of aerial photography is the DJI Phantom, available from DJI. Such drones also are of the remote control variety requiring a ground pilot to utilize a remote control unit to send wireless commands to the drone and receive camera and other sensor data from the drone.

SUMMARY

In one illustrative embodiment, a method is provided for monitoring an area utilizing an unmanned vehicle. The method comprises identifying an area to be monitored by an unmanned vehicle and identifying an unmanned vehicle assigned to monitoring the identified area. The method further comprises generating, for the unmanned vehicle, a travel path to be traversed by the unmanned vehicle using a function that randomizes generation of the travel path. Moreover, the method comprises programming the unmanned vehicle to traverse the generated travel path and initiating operation of the unmanned vehicle to collect data about the area while traversing the generated travel path. In addition, the method comprises monitoring the area utilizing the unmanned vehicle based on the data collected by the unmanned vehicle while traversing the generated travel path.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

It has been recognized that often times individuals, business, and government organizations have facilities, structures, resources, or simply holdings, that encompass large geographical areas that require some type of visual monitoring. Such monitoring may be for purposes of detecting intrusion into the geographical area by trespassers, to locate particular assets, or the like. For example, from a governmental standpoint, visual monitoring of large geographic areas may be required along the border of the particular country to monitor for illegal trespass across the country's borders, along waterways to identify illegal shipping or drug trafficking, at military facilities to provide more secure emplacements, in military action zones to find enemy combatants or military targets, etc. From an individual or commercial business standpoint, a homestead or commercial facility may require visual monitoring of large geographic areas to prevent intrusion, poaching, theft, commercial espionage, or the like, as well as locate assets such as cattle, employee vehicles, and the like, e.g., a rancher may need to visually inspect a large geographic area to find cattle that may have wandered away from the herd or become injured.

Visual monitoring of large geographic areas typically requires expensive security solutions to maintain adequate coverage of the geographic area. Such large geographic areas tend to be too large to utilized fixed cameras to provide adequate coverage, e.g., anything larger than 0.25 square miles) unless substantial monetary investment is made to provide a large number of such fixed cameras and a control system and personnel to manage these cameras, e.g., monetary investments only organizations at the government or military level can afford. In addition, stationary cameras typically have at least one "blind spot" where the camera is not able to obtain images of the particular location, i.e. the field of view of the camera is limited. As a result, manned solutions are typically utilized, e.g., manned security patrols. These manned solutions suffer from being expensive for smaller organizations/private individuals due to the high costs of human resources.

Automated systems, and some human ones, suffer from being predictable. That is, automated systems tend to follow the same scripted activity repetitively such that a pattern of activity is recognizable. Thus, a potential interloper, such as an intruder into the geographical area may be able to observe the pattern of activity from various vantage points at a distance to determine the patterns and identify predictable weaknesses in the patterns that can be exploited so that the interloper may trespass without detection.

The illustrative embodiments provide mechanisms for providing a system of automated surveillance using unmanned aircraft, referred to herein as "drones," that operate in an autonomous or semi-autonomous manner. While unmanned aircraft will be used to illustrate the primary aspects of the illustrative embodiments, it should be appreciated that the mechanisms of the illustrative embodiments may be applied to any unmanned vehicle including unmanned land vehicles, watercraft, spacecraft, subterraneous craft, submersible craft, or the like. The unmanned aircraft, or drones, may be of various types including fixed wing aircraft of horizontal and/or vertical takeoff capability, rotary wing aircraft, e.g., helicopters, or the like. The mechanisms of the illustrative embodiments randomly or pseudo-randomly select or generate a flight path for the drone that is not predictable or detectable outside of the control system.

For example, in one illustrative embodiment, a plurality of pre-determined flight paths may be stored in the system with the system selecting one based on a random or pseudo-random basis to be assigned to a particular drone. The flight paths themselves may be generated using various algorithms for maximizing coverage of a geographical region or area (a "region" is a subset of an "area" in the context of this description), may be manually constructed using computer-aided software packages for specifying flight paths, or any combination of algorithmic and manual generation of flight paths. The selection may be based on a randomization function and/or seed value determined in different ways. For example, in one illustrative embodiment, the seed value may be automatically selected based on specified criteria, such as timestamp of a previous event encountered by the drone, e.g., previous timestamp of the drone returning to the dock, seed value string entered by an operator, or the like. Moreover, any known or later developed random number generator may be utilized and used as a basis for selecting a corresponding flight path from a set of flight paths.

The selected flight path may be periodically changed such that a newly selected flight path is used to replace the previously selected flight path. The period by which the flight path is changed may itself be randomly or pseudo-randomly determined such that the timing of the changes in the flight path is not able to be discerned as a predictable pattern. This periodic change to the flight path may be performed while the drone is still operating on the previous flight path and may be transmitted wirelessly, such as by way of an encrypted transmission, to the drone. In response, the drone may fly to a closest point on the new flight path from its current location and begin operating under the newly selected flight path. Alternatively, this change in the flight path may be performed in response to a pre-defined event, e.g., the drone returning to its docking location, a manually entered command by an operator to change the flight path, or the like.

Moreover, rather than selecting from pre-defined flight paths, the flight paths may be automatically generated in response to randomly selected geographic functions for traversing a specified geographic region using a specified type of pattern or set of input attributes for the flight plan. For example, algorithms may be provided for calculating various geographic functions for filling a geographic region or area taking into consideration the zone of surveillance associated with the drone, i.e. a zone around the drone comprising the maximum viewable or detectable range from the drone for the drone's camera and/or other sensor equipment, natural and man-made features of the geographic area, the boundaries of the geographic area, and the like, so as to maximize coverage of the geographic region or geographic area. The geographic function may specify a particular flight path line in two dimensional space that may take many different forms, e.g., spiral line paths, zig-zag line paths, longitudinal or latitudinal line paths, randomized patterns of lines, or any combination of different paths. The zone of surveillance of the drone may be presented as a geometrical shape around a point corresponding to the drone itself, e.g., a circle, ellipse, rectangle, or the like, such that the path may be calculated by the algorithm such that the total coverage of the zone of surveillance of the drone fills the entirety of the geographic region or area as much as possible, with or without overlaps. These paths may be calculated dynamically and assigned to the drone(s) so that a pre-defined set of flight paths need not be previously determined and stored, thereby increasing the difficulty of prediction or recognition of the flight path of the drone by a potential intruder or interloper.

The flight paths that are generated or selected preferably provide for complete surveillance coverage of a specified geographic region within a geographic area of interest, i.e. all regions of the geographic area are covered by the zones of surveillance associated with the drones. For example, the system of the illustrative embodiments may utilize a single drone to handle a specified geographic area or a plurality of drones which may each be assigned to different geographic regions within a geographic area of interest. The mechanisms of the illustrative embodiments provide algorithms for simultaneous management of a plurality of drones assigned to different geographical regions of a geographical area so as to ensure coverage of the geographical area as well as ensure the safety and proper operation of the drones themselves.

A history of flight path assignments to each of the drones may be stored in association with a drone identifier in a secured storage of the system. The history of the flight path assignment may be used to assist in selection of a flight path from the set of flight paths. That is, in one illustrative embodiment, the history may be retrieved when selecting a flight path for a particular drone. Selection of the flight path may comprise randomly or pseudo-randomly selecting a flight path from the set of flight paths and then comparing the selected flight path to a listing of flight paths previously assigned to the drone within a predefined period of time in the history. If the flight path has already been assigned to the drone within the predefined period of time, the flight path may be removed from consideration and a new flight path selected, randomly or pseudo-randomly. Alternatively, the history may be used to prune the set of flight paths prior to random or pseudo-random selection. In this way, it is guaranteed that within the predefined period of time, the drone will not fly the same flight path as a flight path previously assigned to it The flight path history for the drone may also be used to assist in retrieval efforts should the drone malfunction or otherwise be downed. The latest assigned flight path may be retrieved from the flight path history so as to determine the path that the drone was flying when it was downed. This information along with any last known position information for the drone may be used to focus a search for the drone in the geographical area. This is especially useful when the drone is assigned to a relatively large geographical region or geographical area since it will reduce the amount of time and resources expended retrieving the downed drone.

It should be appreciated that the flight path comprises not only a path of two-dimensional geographic coordinates, but also a third dimension corresponding to altitude of the drone. Thus, not only is the flight path able to be randomized with regard to a two-dimensional path of geographic coordinates, but the altitude of the drone may be randomized at various points along the two-dimensional path as well. Of course, limitations of the altitude variations may be specified such that the drone maintains a suitable altitude to achieve its function of surveillance, e.g. a range of possible altitudes may be specified with the particular altitude of the drone at various points along the flight path being able to be randomized within this specified range.

Thus, the illustrative embodiments provide mechanisms for assigning and managing flight paths of unmanned aircraft so as to maximize coverage of a specified geographical area while maintaining randomness in the flight paths to thereby reduce the likelihood that an outside observer will be able to discern a pattern to the flight paths and exploit any weakness in the surveillance coverage afforded by the unmanned aircraft. The mechanisms of the illustrative embodiments provide regular/constant surveillance of large geographic areas in a way that cannot be predicted by observers such that a cost effective system utilizing a relatively small amount of human resources, and in some cases no human resources, is achieved.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, the illustrative embodiments provide mechanisms for assigning and managing flight paths of one or more unmanned aircraft in order to provide surveillance over a specified geographical area. As such, the mechanisms of the illustrative embodiments employ one or more computing devices for achieving the functionality of the illustrative embodiments. Moreover, mechanisms are provided for transferring the data from the unmanned aircraft as well as instructions/data to the unmanned vehicles in order to program the unmanned aircraft with the selected/generated flight paths. As such, the mechanisms of the illustrative embodiments may be utilized in many different types of data processing environments.

Figure 1:
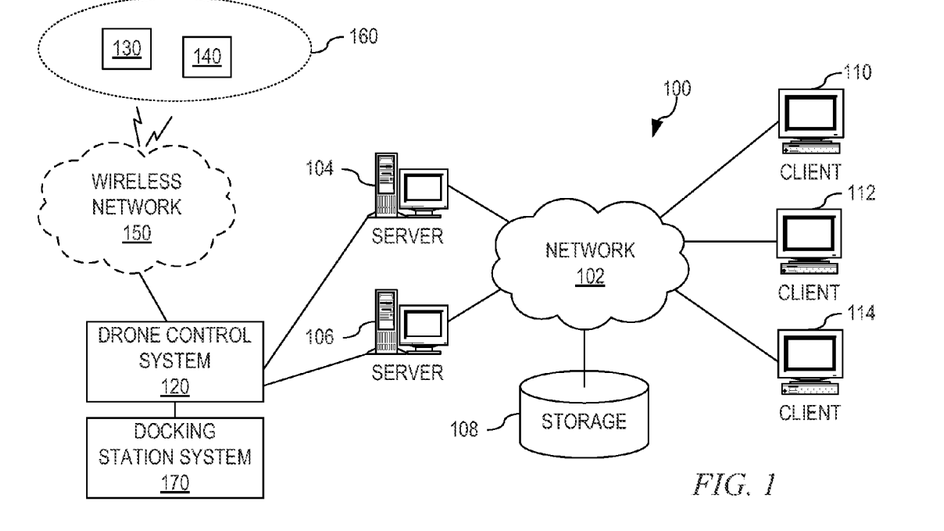
FIG. 1 is an example diagram of a distributed data processing system in which aspects of the illustrative embodiments may be implemented.
Figure 2:
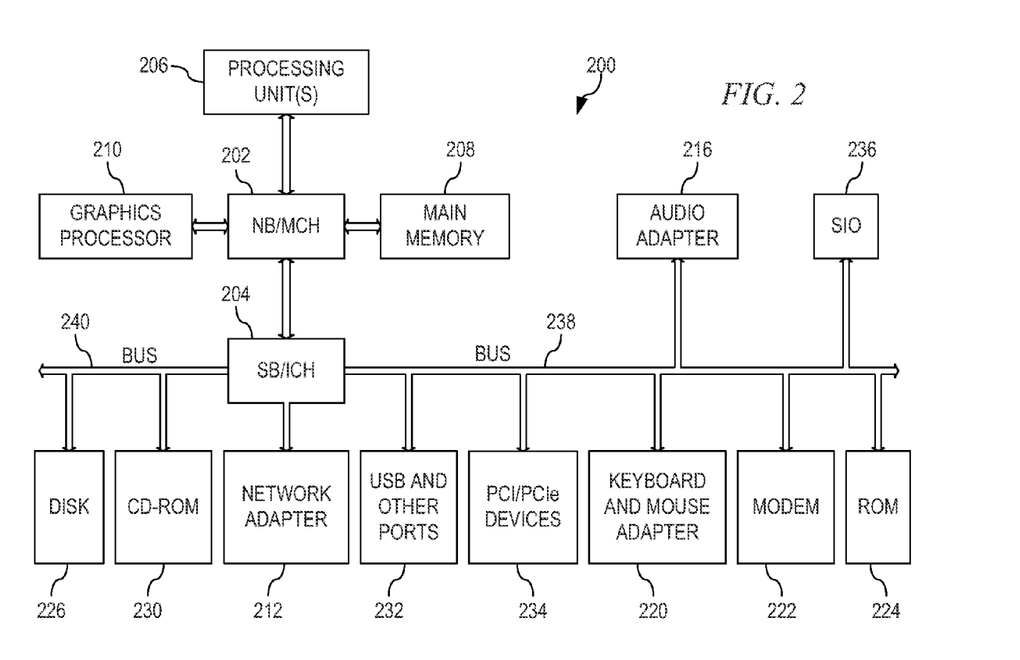
FIG. 2 is an example block diagram of a computing device in which aspects of the illustrative embodiments may be implemented.

In order to provide a general context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the servers 104, 106 may operate to provide a drone control system 120 which operates to implement the mechanisms of the illustrative embodiments as discussed hereafter. One or more of the clients 110, 112, and 114 may be operator workstations or other terminals by which human operators may monitor and control the operation of the drones and, in some cases, take manual control of drones when needed. The servers 104, 106 may communicate with one or more drone vehicles (drone aircraft in the examples herein) 130-140 by way of a secured wireless communication network 150. The secured wireless communication network 150 may be used to obtain substantially real-time data from the drones 130-140 and provide instructions/data to the drones 130-140 to thereby operate the drones 130-140 in a geographical region or area 160. Moreover, in some illustrative embodiments, the servers 104, 106 may have wired connections to docking stations of a docking station system 170 where the drones 130-140 dock to recharge, download any stored data collected by the drone to the servers 104, 106, and receive new instructions from the servers 104, 106. It should be appreciated that when the present description describes the servers 104, 106 as providing instructions/data to the drones, this may be done automatically or at the direction of a human operator at a client 110, 112, or 114 communicating with the server 104, 106. Moreover, the data from the drones 130-140 may be routed by the servers 104, 106 to appropriate clients 110, 112, or 114 so as to output the data received from the drones 130-140 to the human operator via output devices associated with the clients 110, 112, or 114.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
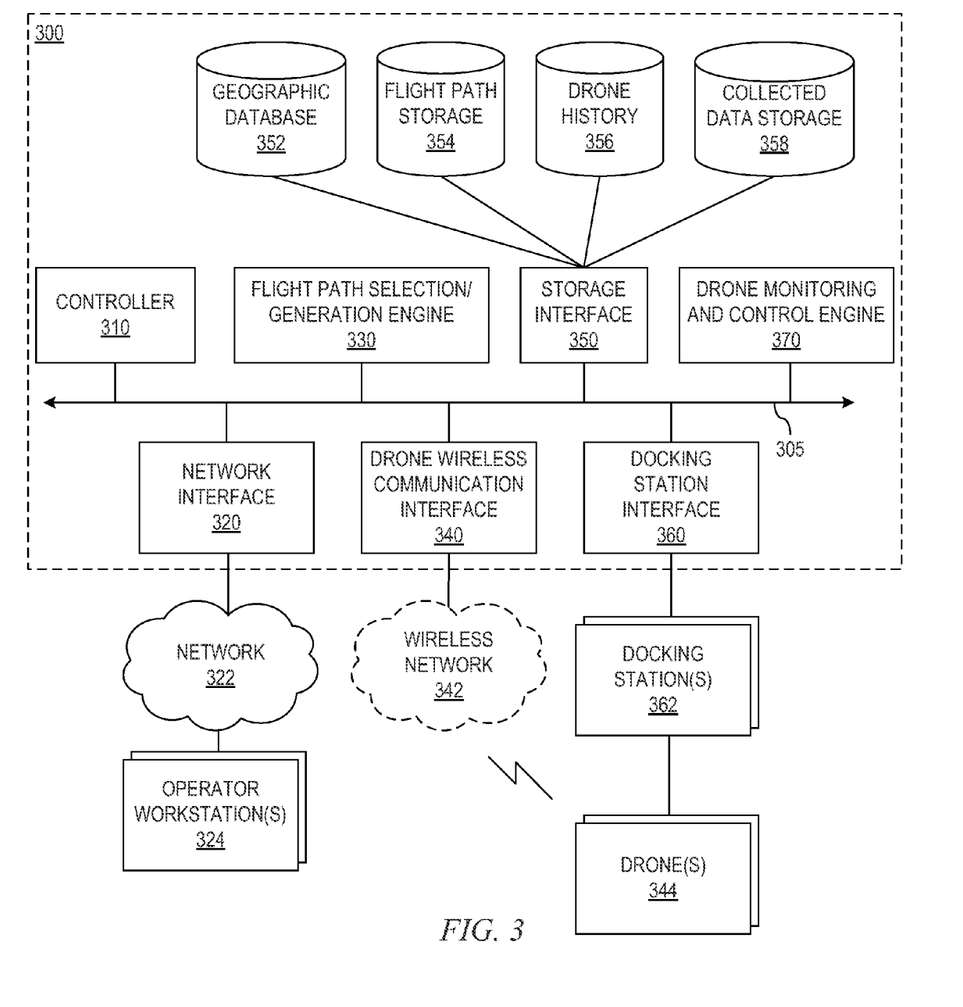
FIG. 3 is an example block diagram illustrating the primary operational elements of a drone control system in accordance with one illustrative embodiment.

FIG. 3 is an example block diagram illustrating the primary operational elements of a drone control system in accordance with one illustrative embodiment. It should be appreciated that the elements shown in FIG. 3 may be implemented in software executed on hardware, e.g., loaded into memory of one or more data processing systems and executed by one or more processors of the one or more data processing systems utilizing computing resources, storage resources, and the like, of the data processing system(s), implemented in dedicated hardware devices for performing the functions and operations of the elements as discussed hereafter, or any combination of software executed on hardware and dedicated hardware devices. In embodiments where the elements are implemented in software executed on hardware, it should be appreciated that the hardware, once configured by the software to execute the particular set of instructions set forth in the software, transforms the hardware into special purpose hardware while the software is being executed by the hardware. Thus, the combination of the software and hardware constitutes specialized hardware for implementing the functionality and operations of the illustrative embodiments.

As shown in FIG. 3, the drone control system 300 comprises a controller 310, a network interface 320, a flight path selection/generation engine 330, a drone wireless communication interface 340, a storage interface 350, a docking station interface 360, drone monitoring and control engine 370, and various data storages 352-358 as will be described hereafter. The controller 310 comprises logic for controlling the overall operation of the drone control system 300 and for orchestrating the operation of the other elements 320-370 of the drone control system 300. Any operations or functions not specifically attributed to one of the other elements 320-370 is performed by the controller 310 which also facilitates the communication between the elements 320-370 via a communication pathway 305, which may be one or more communications busses or the like.

The network interface 320 provides logic for facilitating a communication pathway for communicating to/from one or more data networks 322, including buffers, caches, communication stacks, network adapters, processors, and any other known or later developed logic elements used for data communication with data networks. The network interface 320 may operate to provide communications to operator workstations 324 via the one or more data networks 322 including outputting data collected by drones so as to output such data in an visual and/or audible manner via the operator workstations 324. Moreover, the network interface 320 operates to receive data communications from operator workstations 324 and provide the received data to appropriate elements of the drone control system 300 so as to facilitate proper operation of drone control system 300 and the drones 344 in accordance with commands from human operators provided via the operator workstations 324.

The flight path selection/generation engine 330 comprises logic for selecting and/or generating flight paths for assignment to drones and also assigning the selected/generated flight paths to the drones for execution, as will be described in greater detail hereafter. In general, the flight path selection/generation engine 330 performs functions for randomly or pseudo-randomly selecting/generating flight paths to be assigned to drones 344 utilizing information stored in the various storage devices 352-358 and facilitates sending the selected/generated flight paths to the drones 344 via one or more of the wireless network 342 or docking stations 362. The random or pseudo-random selection/generation of the flight paths is to reduce the likelihood that the path of motion of the drones 344 will be able to be predicted by an outside observer, thereby reducing the likelihood that the outside observer will discern a pattern and weaknesses in the pattern that can be exploited so as to obtain unauthorized access to a geographical area being monitored by the drones 344.

The drone wireless communication interface 340 is similar to the network interface 320 but facilitates data communication to/from the drones 344 via the wireless networks 342. The wireless communication interface 340 may utilizing any known or later developed suitable wireless communication type and protocol including, but not limited to, radio communications, satellite communications, cellular network communications, or the like. In some cases, small limited range communications may be possible, such as Bluetooth communications, infrared, or the like, however most governmental and commercial applications of the mechanisms of the illustrative embodiments will require communication types and protocols that facilitate much larger ranges of communication. As with the network interface 320, the drone wireless communication interface 340 comprises any logic necessary for data communication to/from the drones 344 via the wireless network 342 including, but not limited to, buffers, caches, communication stacks, network adapters, processors, and any other known or later developed logic elements used for data communication via a wireless network 342.

The storage interface 350 provides a communication interface through which data may be stored to, and retrieved from, the various data storage devices 352-358. Examples of such a storage interface 350 include Small Computer System Interface (SCSI) adapters, Peripheral Component Interconnect (PCI) or PCI Express (PCIe) adapters, or the like.

The data storage devices 352-358 comprise a geographic database 352, a flight path storage 354, a drone history 356, and a collected data storage 358. The geographic database 352 comprises geographic data that includes a geographic area of interest that is to be monitored by the drones 344. This geographic data may include the division of the geographic area into multiple geographic regions, with one or more drones being assigned to monitor corresponding associated geographic regions. The assignment of drones to particular geographic regions or areas may be stored in the drone history 356 data structure in addition to other information about the drones and their previously assigned flight paths, as discussed hereafter. The geographic database 352 stores various geographic information including elevations, terrain type, building locations, notable geographic features, boundary information, and the like. In some illustrative embodiments, geographic database 352 may comprise dynamically obtained information from various services including, but not limited to, weather information from weather services, potential detected intruder/target information from law enforcement services, military command/control services, or the like. Positions of potential weather issues and potential intruders/targets may be specified in data in the geographic database 352. Any information regarding the status of the geographical area to be monitored by the drones 344 may be stored in the geographic database 352.

The flight path storage 354 stores one or more sets of predefined flight paths for assignment to one or more drones 344. There may be a single set of predefined flight paths that is used to assign to all of the drones 344 or there may be multiple sets of predefined flight paths for association with one or more subsets of drones in a fleet of drones 344. For example, if the geographic area is divided into multiple geographic regions, a subset of drones may be associated with each geographic region. This subset of drones may be provided with a subset of the set of flight paths stored in the flight path storage 354 or a separate copy of the set of flight paths stored in the flight path storage 354 from which flight paths are assigned to the drones of the subset of drones. Thus, for example, a set of flight paths may comprise flight paths 1-100. Flight paths 1-20 may be assigned to a subset A of drones associated with geographic region A, flight paths 21-40 may be assigned to a subset B of drones associated with geographic region B, flight paths 41-60 may be assigned to subset C associated with geographic region C, and the remainder flight paths 61-100 may be associated with subset D of drones associated with geographic region D. Alternatively, each subset A-D of drones may have their own separate copy or version of flight paths 1-100 from which to select flight paths for assignment to the subset of drones. A copy or version of flight paths 1-100 may comprise simply a set of pointers to the flight path entries in the flight path storage 354 such that each subset may have their own set of 100 pointers to a common set of flight paths stored in the flight path storage 354 and pointers may be allocated to different drones within a subset so as to associated the drone with a particular flight path within the set of flight paths, or associated subset of flight paths depending on the implementation.

Flight paths may be selected from the set or subset of flight paths associated with a given subset of drones in a random or pseudo-random manner by the flight path selection/generation engine 330. In so doing, the flight path selection generation engine 330 may receive a seed value from the controller 310 which is used to perform pseudo-random calculation of a value for selecting a flight path from the set or subset of flight paths. The seed value may be determined in different ways. For example, in one illustrative embodiment, the seed value may be automatically selected based on specified criteria, such as timestamp of a previous event encountered by the drone, e.g., previous timestamp of the drone returning to the dock, seed value string entered by an operator, randomly generated seed value, or the like. Moreover, any known or later developed random number generator may be utilized and used as a basis for selecting a corresponding flight path from a set of flight paths.

It should be appreciated that the set or subset of flight paths (hereafter referred to simply as the "set" of flight paths for simplicity) may be dynamically updated such that flight paths already assigned to drones or assigned to drones within a predetermined period of time from a previous reset of the flight path allocation algorithm are eliminated from the set for consideration in assignment to drones. Thus, for example, if flight path 34 has been assigned to a drone within the predetermined period of time, then flight path 34 is removed from further consideration as part of the set and will not be able to be assigned to another drone until the predetermined period of time has elapsed, e.g., 1 day. In this way, at least within the predetermined period of time, a drone will not repeat the same flight path. This may be done on a drone-by-drone basis such that a separate listing of flight paths assigned to the drone within the predetermined period of time may be maintained and used to filter out the future possibilities for flight path assignment for this drone within the predetermined period of time. Such information may be stored in the drone history 356, for example.

The flight paths that are stored in the flight path storage 354 may be generated using various geometrical or mathematical functions given a set of input parameters specifying the boundaries of the geographical region or area to be encompassed by the flight path, as obtained from the geographic database 352, and the zone of surveillance of the particular drones that are to implement the flight path, as may be obtained from drone information stored in the drone history 356 as discussed hereafter. That is, a mathematical function or geometric function that calculates paths of a particular type to maximize coverage of the geographical area may be utilized to calculate a flight path that can be added to the set or subset of flight paths stored in the flight path storage 354 in association with the set or subset of drones 344. Alternatively, a human operator may specify one or more flight paths to be stored in the flight path storage 354 via a manual process using a graphical depiction of the geographic region or area and a human operated input device to essentially "draw" the flight path over the geographic region or area. Of course any other method of calculating a path of motion, or flight path, of a vehicle through a given geographic region or area so as to maximize coverage of the region or area may be used without departing from the spirit and scope of the present invention.

It should be appreciated that rather than having a static set of flight paths from which to select stored in the flight path storage 354, the flight path assigned to a drone may be dynamically generated by the flight path selection/generation engine 330 in a similar manner as the flight paths are generated for the predetermined set of flight paths, e.g., using various geometric and/or mathematical functions and/or manual input of flight paths. The selection of which geometric and/or mathematical functions to use may be performed in a random or pseudo-random manner with the selected function then being implemented dynamically to generate a new flight path for allocation to a drone in the set of drones 344.

The flight path selection/generation engine 330 may periodically change the assigned flight paths of drones 344 such that a newly selected flight path is used to replace the previously selected flight path for the particular drones 344. The period by which the flight path is changed may itself be randomly or pseudo-randomly determined such that the timing of the changes in the flight path is not able to be discerned as a predictable pattern. This periodic change to the flight path may be performed while the drone is still operating on the previous flight path and may be transmitted wirelessly, such as by way of an encrypted transmission via the drone wireless communication interface 340 and wireless network 342, to the drone 344. In response, the drone may fly to a closest point on the new flight path from its current location and begin operating under the newly selected flight path. Alternatively, this change in the flight path may be performed in response to a pre-defined event, e.g., the drone returning to its docking location, a manually entered command by an operator to change the flight path, or the like.

The drone history 356 stores information about each of the drones 344 in a fleet of drones managed and controlled by the drone control system 300. This information may include unique identifiers of each of the drones 344, configuration information about the drones 344 specifying capabilities of the drones, assignment of the drones to subsets of drones, a history associated with each drone as to the assignment of flight paths to the drone, current status information for each drone, e.g., docked, operational, downed, charging, etc., and other suitable information for managing and controlling the drones and in particular the assignment of flight paths to the drones in accordance with the illustrative embodiments. The configuration information for the drones may be used to specify the surveillance zones for the drones in accordance with their capabilities. The drone assignment information may be used to allocate drones to monitoring specified geographic regions/areas. The history associated with each drone may be used to both assist in assigning new flight paths to the drones as well as monitoring previous assignments so as to assist in finding downed drones. The current status information for each drone may be used to identify which drones can be assigned to surveillance operations for a monitoring associated geographic regions/areas.

The collected data storage 358 stores the data collected by the various drones for a specified period of time for presentation to operators via the operator workstations 324 and/or archival storage. This data may include video image data, sensor data, and the like. This data may also comprise data indicative of the drones' operating status so as to diagnose possible causes of downed drones if necessary.

The data storage devices 352-358 are shown as separate storage devices in FIG. 3 for purposes of illustrating the differences in the data stored and their uses, however it should be appreciated that these data storage devices 352-358 may in fact be integrated with one another into any number of storage devices, e.g., one storage device or a plurality of storage devices. For example, in one illustrative embodiment, each of the storage devices 352-358 shown in FIG. 3 may instead be separate data structures in a same set of one or more storage devices of the drone control system 300.

The docking station interface 360 provides a communication interface through which data may be received from the docking stations 362 and provided to the docking stations 362 for purposes of obtaining data from the drones 344 and uploading instructions to the drones 344. That is, rather than, or in addition to, utilizing the wireless communication network 342 to communicate data to/from the drones 344, the mechanisms of the illustrative embodiments may utilize drone docking stations 362 in which the drones 344 sit to recharge their fuel, e.g., electric charge, liquid fuel, and/or the like. These drone docking stations 362 may further have data transfer capabilities that allow data to be transferred between the drones 344 and the docking stations 362 such that they form a communications adapter for communicating between the drone control system 300 and the drones 344.

The drone monitoring and control engine 370 provides additional logic for monitoring the operation of the drones 344 and controlling their operation when necessary. For example, the drone monitoring and control engine 370 may monitor current position and status information for the drones, compare this information to assigned flight path information so as to ensure that the drones 344 are not off course, and then send commands to the drones to return them to their intended flight paths should they be off course, e.g., re-calibrate the drones so that their internal representation of their position is corrected if necessary. Any monitoring and control operations for monitoring the operation and controlling the operation of the drones may be achieved through the logic of the drone monitoring and control engine 370. Of particular emphasis in the illustrative embodiments, the drone monitoring and control engine 370 may facilitate the programming of the drones 344 with the selected/generated flight paths as obtained from the flight path selection/generation engine 330.

The drones 344 are any unmanned vehicles that may implement autonomous or semi-autonomous paths of motion within a geographic region and/or area. While unmanned aircraft are used to illustrate the primary aspects of the illustrative embodiments, it should be appreciated that the mechanisms of the illustrative embodiments may be applied to any unmanned vehicle including unmanned land vehicles, watercraft, spacecraft, subterraneous craft, submersible craft, or the like. The unmanned aircraft, or drones, may be of various types including fixed wing aircraft of horizontal and/or vertical takeoff capability, rotary wing aircraft, e.g., helicopters, or the like.

To further illustrate the operation of the above mechanisms, in accordance with one illustrative embodiment, an example is provided hereafter in which a geographic area SA is specified and its corresponding information is stored in the geographic database 352. This geographic area SA is intended to be monitored by a fleet of N programmable autonomous or semi-autonomous surveillance drones 344, i.e. drones D1-DN. A set of X drone geographic traversal paths over the geographic area SA is provided in the flight path storage 354 where each traversal path Tp1-Tpx is unique relative to the other traversal paths Tp1-Tpx. For example, one traversal path Tp1 may be a simple set of longitudinal paths across the geographic area SA. Another traversal path Tp4 may be a set of connected spirals each covering a small subset (geographic region) of the geographic area SA. A third traversal path Tp6 may be the same pattern as Tp1 but rotated 90 degrees, e.g., a latitudinal traversal path. Essentially, each traversal path TpN has a corresponding drone flying the flight path with a different bearing for any given point within the geographic area SA.

The flight path selection/generation engine 330 randomly, or pseudo-randomly, selects a flight path from the set of traversal paths Tp1-Tpx (or flight paths) and the drone monitoring and control engine 370 causes a selected drone 344 to be programmed with the selected flight path, either via the drone wireless communication interface 340 and wireless network 342, or via the docking station interface 360 and docking stations 362. Flight paths may be selected and programmed into the drones in the fleet 344 in a sequence and in a continuous loop during the hours that the drones 344 are designated to be monitoring the geographic area SA. It should be appreciated that the network interface 320 allows authorized human operators to take manual control of a drone via the network 322 and network interface 320 to thereby change the drone programming, e.g., take the drone offline, add flight paths, or the like. These mechanisms also allow for notifications to be sent to the human operators when an event is encountered that requires human operator attention, e.g., a drone does not response to interrogation requests, is downed, or the like.

The number N of drones 344 in the drone fleet is preferably sufficiently large that the time required for N−1 drones to complete their missions will be enough time to charge a drone back to 100% fuel capacity. This size is determined by the size of the drone fleet available and the size of the geographic area SA to be monitored. In some cases, the fleet of drones, i.e. the value of N, may include spare drones that accommodate occasional losses of drones without a need for human operator intervention such that the loss of drones will not affect the drone control system 300 ability to completely cover the designated geographical area SA. The drone scheduler/control system manages the entire fleet such that wear (total hours of operation) is as close to equal as possible across all drones. This makes prediction of breakdown easier based on known mean time between failures (MTBF) of the mechanical equipment. This also allows for computation of more accurate models of future failures since, after a period of time, wear out data will start to accumulate in enough volume to serve as a predictor of future failures.

In a typical operation scenario, the drone control system 300 programs a drone D1 344 with a selected/generated traversal path, e.g., Tp3, selected/generated by the flight path selection/generation engine 330. The drone D1 344 traverses the path it is programmed with, i.e. Tp3, collecting data such as video imaging data, sensor data, and the like. The drone D1 344 may then return to its docking station 362 to charge and at the same time uploads the collected data to the drone control system 300 for archival in the collected data storage 358. The drone control system 300 may further then select and program the drone D1 344 with a new traversal path, e.g., Tp7, again selected/generated by the flight path selection/generation engine 330 and the process is repeated. This process may continue for each drone D1-DN.

It should be appreciated that if a given drone does not return in a predetermined amount of time, the drone control system 300 may send a notification to a human operator via the human operator's workstation 324 to inform them that the drone is missing, which flight path the drone was executing as determined from the drone history 356, its last known location, and any other pertinent information from the data storage devices 352-358 that will aid in recovery of the missing drone.

It should be appreciated that if there are no spare drones remaining to assist with the monitoring of the geographical area SA, the drone control system 300 may insert a time interval in the schedule of drone programming such that during this time interval, no drones are in flight or a minimum number of drones are in flight. This time interval is preferably long enough to make an entire recharge cycle of the drones remaining in the fleet. For example, in cases where hardware failures make it impossible to fulfill the schedule of coverage, the drone control system 300 will randomly or pseudo randomly skip drone shifts until the fleet is replenished with repaired or recovered drones. Alternatively, the flight paths assigned to the remaining drones may be dynamically updated so as to maximize the coverage capability of the remaining drones.

Figure 4A:
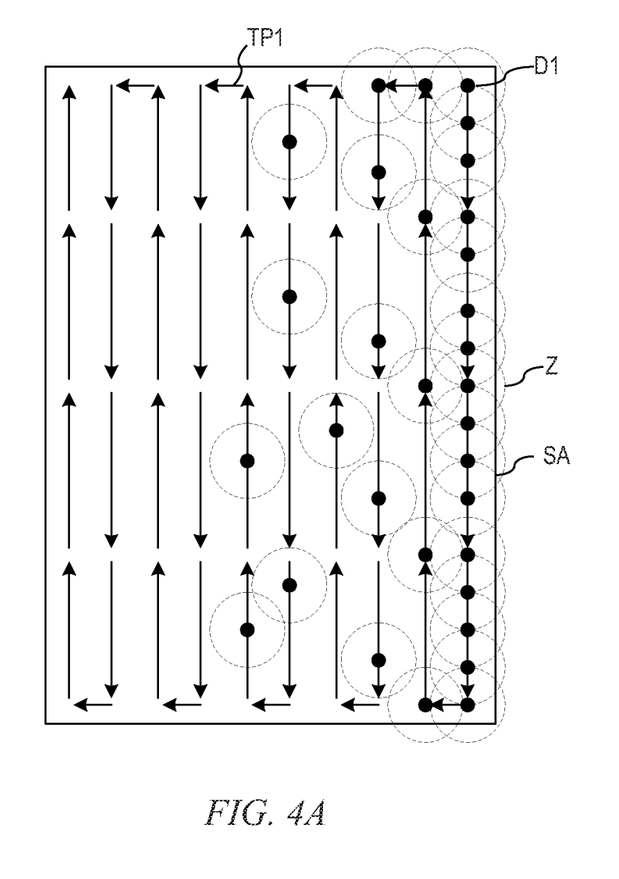
FIGS. 4A and 4B are example diagrams illustrating various flight path options for a specified geographical area in accordance with one illustrative embodiment.
Figure 4B:
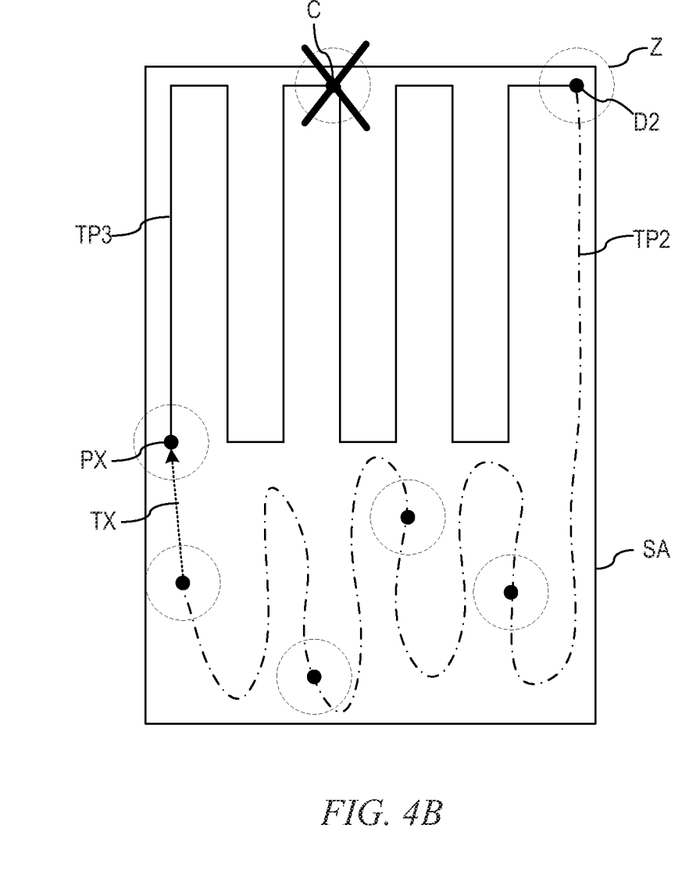

FIGS. 4A and 4B are example diagrams illustrating various flight path options for a specified geographical area in accordance with one illustrative embodiment. FIG. 4A illustrates a first flight path that may be assigned to a drone D1 for traversing the geographic area SA. The flight path Tp1, in accordance with the illustrative embodiments, is randomly or pseudo-randomly selected/generated by the drone control system 300 so as to eliminate the ability by an outside observer to discern a specified pattern, i.e. the outside observer is not informed as to what flight path has been assigned to the drone D1 and thus, cannot predict the movements of the drone D1 over the geographic area SA. Because this flight path Tp1 can be any of a number of possible flight paths, the outside observer cannot predict where the drone D1 will be at any one time and thus, is unable to identify weaknesses in the flight path Tp1 or portions of the geographic area that will not be monitored by the drone D1 at particular points in time.

As shown in FIG. 4A, based on information in the drone history data stored 356 regarding drone configuration and capabilities, a zone of surveillance Z is associated with the drone D1. Thus, it can be seen that the flight path Tp1 is specified such that the zone of surveillance Z of the drone D1 as the drone D1 traverses the path Tp1 covers a majority or maximum amount of the geographic area SA. It should be appreciated that while only a single drone is shown in FIGS. 4A and 4B, in some illustrative embodiments, multiple drones may be used to monitor the same geographic area SA with differing flight paths and altitudes so as to reduce the likelihood that portions of the geographic area SA will remain unmonitored for long periods of time. The flight paths are preferably chosen/generated such that collision of the drones is avoided, e.g., by comparing the flight paths, identifying portions of the flight paths where collision is possible, and modifying timing of the drones so that collisions are avoided. For purposes of ease of the illustration, the representation of the drone D1 and zone Z is not repeated throughout the entire flight (or traversal) path Tp1 in FIG. 4A with only representative drone D1 and zone Z elements shown.

FIG. 4B illustrates an example of flight paths in the case of dynamic updating of the flight path while the drone is still operating on a previously assigned flight path. As shown in FIG. 4B, initially, the drone D2 is programmed with a manually created flight path Tp2 which is randomly, or pseudo-randomly, selected from a set of possible flight paths for the drone D2. The set of possible flight paths for drone D2 may have been previously pruned based on prior assignments of flight paths to the drone D2 or the subset of drones that drone D2 is associated with. As mentioned above, this set of possible flight paths may be re-initialized at the end of a predetermined time period such that within the predetermined time period, flight paths are not too frequently repeated by drones.

At some point in time during the flight of the drone D2 along flight path Tp2 over geographic area SA, the drone control system 300 of the illustrative embodiments determines that a change in flight path is to be sent to the drone D2. For example, this may occur in response to expiration of a predetermined time period from when the drone D2 began its previous flight path Tp2, in response to an operator input requesting modification of the flight path of the drone D2, or detection of a particular event that requires reprogramming of the drone D2 while in flight, e.g., power consumption higher than normal in the drone D2, reports being received of an intruder in a portion of the geographic area SA, or the like.

The drone control system 300 may select/generate a new flight path for drone D2 in the manner discussed above and send instructions wirelessly to the drone D2 to initiate a new flight path Tp3. The drone D2 may then determine a nearest point Px for starting the new flight path Tp3 and fly along a path Tx from its current position to the determined nearest point Px on the new flight path Tp3. The drone D2 will then traverse the new flight path Tp3 to continue its monitoring of the geographic area SA under its new programming.

At some point in time later C as the drone D2 is traversing the flight path Tp3, it may be determined that contact with the drone D2 has been lost (represented by the bold "X" over the drone D2 in FIG. 4B). The point C may be the last known position of the drone D2 and, along with the identification of the last programmed flight path Tp3 of the drone D2, as retrieved from the drone history data storage 356, may be used to direct recovery efforts to try to find the drone D2 and return it to a base of operations for repair and/or recharging. While point C may be the drone's last known position, this does not mean that the drone D2 will necessarily be found at that precise position and instead may be found in a close vicinity to the point C. However, knowing the point C and the flight path Tp3 eliminates a large part of the geographic area SA as potential locations of the downed drone D2.

It should be appreciated that the drones D1 and D2, as they traverse their assigned flight paths Tp1-Tp3, are using their on-board cameras, sensors, and the like, to collect data that is stored locally in a storage device of the drones D1 and D2 and/or transmitted back to the drone control system 300 via a secured wireless communication network. The collected data may be received by the drone control system 300 in near real-time using the secured wireless communication network or may be received in a delayed manner once the drone returns to its recharging dock where it may then download the collected data via the dock to the drone control system 300 and receive new programming.

Figure 5:
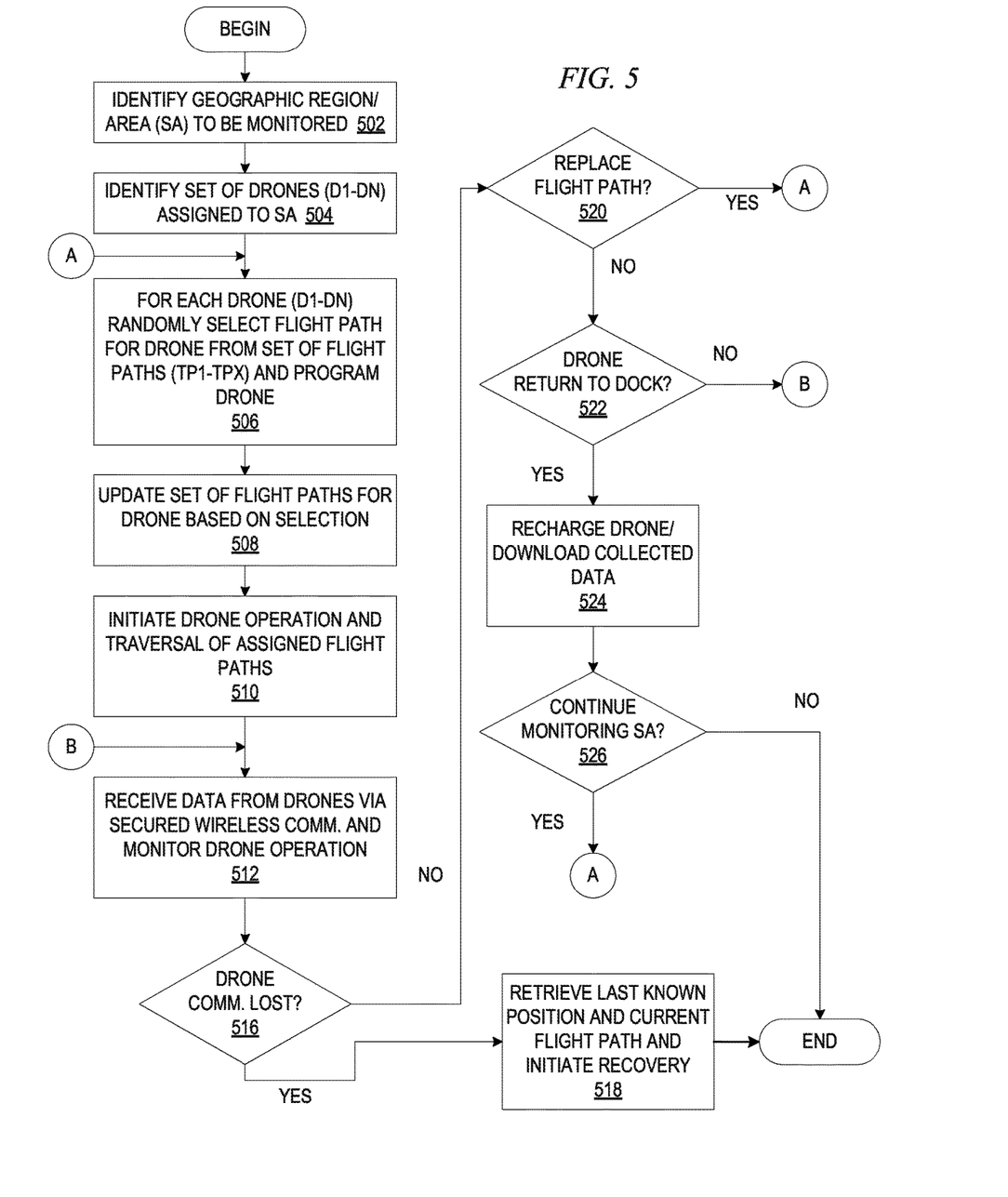
FIG. 5 is a flowchart outlining an example operation for assigning and managing flight paths for drones in accordance with one illustrative embodiment.

FIG. 5 is a flowchart outlining an example operation for assigning and managing flight paths for drones in accordance with one illustrative embodiment. The example shown in FIG. 5 assumes that each subset of drones D1-Dn is assigned to monitor a corresponding geographic region/area (SA) and has an associated set of predefined flight paths Tp1-Tpx from which a flight path may be selected for each of the drones in the subset of drones D1-Dn. It should be appreciated that while this example embodiment uses a predefined set of flight paths Tp1-Tpx, as noted above, the flight paths may be dynamically generated and/or entered manually by a human operator. Moreover, while the example embodiment uses a single set of flight paths Tp1-Tpx for all of the drones in the subset of drones D1-Dn, each drone may have its own set, or copy of the set of flight paths assigned to the subset of drones D1-Dn, such that each drone is capable of being assigned a same flight path as another drone at various times, i.e. each of drones D1-Dn may be assigned flight path Tp3. The drone control system 300, and specifically the flight path selection/generation engine 330 may comprise logic to ensure that at any one point in time, no two drones have the same assigned flight path, however at different times the same flight path may be assigned to different drones. The set of flight paths for a particular drone or set of drones may be pruned as flight paths are assigned so that the same flight path is not selected more than once during a predetermined time period. At the end of the time period, the set of flight paths may be reinitialized such that previously pruned flight paths are added into the set so that they may again be selected for assignment to drones.

As shown in this example embodiment, the operation starts with the identification of the geographic region/area (SA) to be monitored (step 502). A set of drones D1-Dn associated with SA is identified (step 504) and for each drone D1-Dn a flight path is randomly (or pseudo-randomly) selected for the drone from a set of flight paths Tp1-Tpx, and the drone is programmed to traverse its selected flight path (step 506). The set of flight paths for the drone is then updated to reflect the flight path selection such that the same flight path will not be selected for the drone again within a predetermined time period (step 508). The drone operation and traversal of the assigned flight path is then initiated (step 510).

While the drone operates, data may be received from the drone via a secured wireless communication (step 512). This data may include the data collected for monitoring the geographic region/area SA and/or operational data of the drone for purposes of monitoring the operation of the drone to ensure proper performance of the drone.

A determination is made as to whether communication with the drone has been lost, i.e. the drone has not provided data for a specified period of time (step 516). If so, then the last known reported position of the drone is retrieved along with the flight path that was currently assigned to the drone. Recovery of the drone is then initiated using the last known position and the flight path to direct recovery efforts to a specified portion of the geographic region/area SA corresponding to the last known position and possible future positions of the drone according to the flight path.

If the drone communication has not been lost, then a determination is made as to whether the assigned flight path of the drone should be replaced (step 520). As discussed above, the drone control system may periodically, or in response to an event or manual input, change the flight path assignment of a drone while the drone is operating under a previously assigned flight path. Thus, for example, at the expiration of a time period (predetermined or randomly determined), the flight path of the drone may be replaced such that operation returns to step 506 and a new flight path is selected for the specified drone from the remaining flight paths in the set of flight paths associated with the drone. In such a case, when initiating drone operation in step 510, the drone travels to the closest point, to its current position, on the new flight path.

If the flight path is not to be replaced, then a determination is made as to whether the drone has returned to its recharging dock (step 522). If not, the operation returns to step 512 and continues to receive data from the drone and monitor its operation. If the drone has returned to its dock, then the drone is recharged and any data not already received by the drone control system may be downloaded from the drone into the drone control system for archival purposes (step 524). A determination is made as to whether monitoring of the geographical region/area SA by this drone is to continue (step 526). If not, the operation ends. If so, then the operation returns to step 506 for reprogramming of the drone.

Thus, the illustrative embodiments provide mechanisms for assigning and managing travel paths of unmanned vehicles so as to maximize coverage of a specified geographical area while maintaining randomness in the travel paths to thereby reduce the likelihood that an outside observer will be able to discern a pattern to the travel paths and exploit any weakness in the surveillance coverage afforded by the unmanned vehicle. The mechanisms of the illustrative embodiments provide regular/constant surveillance of large geographic areas in a way that cannot be predicted by observers such that a cost effective system utilizing a relatively small amount of human resources, and in some cases no human resources, is achieved.

It should be appreciated that while the primary illustrative embodiments described above are described with regard to implementation with unmanned aircraft, the illustrative embodiments are not limited to such. Rather, the mechanisms of the illustrative embodiments may be utilized with any unmanned vehicle whether it be an aircraft, a land vehicle, a subterranean vehicle, a watercraft, a submersible vehicle, or a space vehicle. The principles of the illustrative embodiments apply regardless of the type of vehicle so as to achieve an unpredictable path of motion of the vehicle over a particular geographic region or geographic area. In the case of space, water, and subterraneous vehicles, this geographic region or area may be specified in three-dimensions rather than two-dimensions taking into account depth in a similar manner as discussed above with regard to altitude. In some instances, where a vehicle may not be able to be returned to a docking platform or the like, the exchange of instructions/data may be by way of secure wireless communications. Thus, the mechanisms of the illustrative embodiments may be applied to any unmanned vehicle.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    identifying an area to be monitored by an unmanned vehicle;
    identifying an unmanned vehicle assigned to monitoring the identified area;
    generating, for the unmanned vehicle, a travel path to be traversed by the unmanned vehicle using a function that randomizes generation of the travel path;
    programming the unmanned vehicle to traverse the generated travel path;
    initiating operation of the unmanned vehicle to collect data about the area while traversing the generated travel path;
    monitoring the area utilizing the unmanned vehicle based on the data collected by the unmanned vehicle while traversing the generated travel path;
    generating a new travel path to be traversed by the unmanned vehicle using the function or a different function that randomizes generating of the travel path; and
    in response to generating the new travel path, re-programming the unmanned vehicle to traverse the new travel path, wherein, in response to the re-programming of the unmanned vehicle, the unmanned vehicle moves to a closest position of the new travel path from a current position of the unmanned vehicle and begins traversing the new travel path, and wherein the new travel path is generated in response to an elapse of a randomly or pseudo-randomly determined time period.

2. The method of claim 1, wherein generating the travel path to be traversed by the unmanned vehicle using a function that randomizes generation of the travel path comprises randomly or pseudo-randomly selecting the travel path from a set of predefined travel paths.

3. The method of claim 2, further comprising:
    storing, for the unmanned vehicle, a history of travel paths previously assigned to the unmanned vehicle; and
    pruning the set of predefined travel paths based on the history of travel paths so as to remove travel paths previously assigned to the unmanned vehicle from the set of travel paths prior to selecting the travel path from the set of predefined travel paths.

4. The method of claim 2, wherein at least one travel path in the set of predefined travel paths is a manually generated travel path generated by a user utilizing a graphical user interface to manually draw the manually generated travel path over a depiction of the area.

5. The method of claim 1, further comprising:
    monitoring operation of the unmanned vehicle while the unmanned vehicle traverses the travel path to detect whether the unmanned vehicle experiences a failure;
    in response to detecting that the unmanned vehicle has experienced a failure, retrieving the generated travel path and determining a last known position of the unmanned vehicle along the generated travel path; and
    controlling recovery operations for recovering the unmanned vehicle based on the generated travel path and the last known position of the unmanned vehicle along the generated travel path.

6. The method of claim 5, further comprising:
    in response to detecting that the unmanned vehicle has experienced a failure, performing operations to adjust scheduling of other unmanned vehicles in a fleet of unmanned vehicles to compensate for the failure of the unmanned vehicle.

7. The method of claim 6, wherein the operation to adjust scheduling of other unmanned vehicles comprises inserting a time interval between scheduling of operations of other unmanned vehicles by randomly or pseudo-randomly selecting schedules of other unmanned vehicles to skip.

8. The method of claim 1, wherein generating the travel path to be traversed by the unmanned vehicle using a function that randomizes generation of the travel path comprises dynamically generating the travel path using a randomly or pseudo-randomly selected mathematical or geographic algorithm.

9. The method of claim 8, wherein the mathematical or geographic algorithm generates a travel path based on surveillance capabilities of the unmanned vehicle, natural and man-made geographic features of the area, and boundaries of the area to be monitored.

10. The method of claim 1, wherein the new travel path is generated while the unmanned vehicle is traversing a previous travel path and the re-programming of the unmanned vehicle is performed dynamically while the unmanned vehicle is traversing the previous travel path.

11. The method of claim 1, wherein the travel path is specified in three-dimensional space, wherein each point along the travel path has three-dimensional coordinates.

12. The method of claim 1, wherein:
identifying the area to be monitored further comprises dividing the area into a plurality of regions,
identifying an unmanned vehicle assigned to monitor the identified area comprises assigning, to each region, a different unmanned vehicle from a fleet of unmanned vehicles, and
generating a travel path to be traversed by the unmanned vehicle comprises assigning, to each different unmanned vehicle, a randomly or pseudo-randomly generated travel path.

13. The method of claim 12, wherein at least two regions in the plurality of regions are associated with different randomly or pseudo-randomly generated travel paths.

14. The method of claim 13, wherein assigning, to each different unmanned vehicle, a randomly or pseudo-randomly generated travel path comprises, for each region in the plurality of regions:
associating with the region a set of predefined travel paths; and
randomly or pseudo-randomly selecting a travel path, for assignment to a corresponding unmanned vehicle, from the set of predefined travel paths associated with the region, wherein a first region in the plurality of regions has a different associated set of predefined travel paths than a second region in the plurality of regions.

15. The method of claim 1, wherein monitoring the area utilizing the unmanned vehicle based on the data collected by the unmanned vehicle while traversing the generated travel path comprises:
receiving digital images captured by the unmanned vehicle; and
analyzing the digital images for indications of unauthorized trespass into the area.

16. The method of claim 1, wherein generating the travel path to be traversed by the unmanned vehicle using a function that randomizes generation of the travel path comprises:
setting a seed value for the function based on a timestamp value associated with an event previously encountered by the unmanned vehicle during a previous operation of the unmanned vehicle; and
generating the travel path based on an evaluation of the function using the seed value.

17. A computer program product comprising a computer readable storage medium having a computer readable program stored therein, wherein the computer readable program, when executed on a computing device, causes the computing device to:
identify an area to be monitored by an unmanned vehicle;
identify an unmanned vehicle assigned to monitoring the identified area;
generate, for the unmanned vehicle, a travel path to be traversed by the unmanned vehicle using a function that randomizes generation of the travel path;
program the unmanned vehicle to traverse the generated travel path;
initiate operation of the unmanned vehicle to collect data about the area while traversing the generated travel path;
monitor the area utilizing the unmanned vehicle based on the data collected by the unmanned vehicle while traversing the generated travel path;
generate a new travel path to be traversed by the unmanned vehicle using the function or a different function that randomizes generating of the travel path; and
in response to generating the new travel path, re-reprogram the unmanned vehicle to traverse the new travel path, wherein, in response to the re-programming of the unmanned vehicle, the unmanned vehicle moves to a closest position of the new travel path from a current position of the unmanned vehicle and begins traversing the new travel path, and wherein the new travel path is generated in response to an elapse of a randomly or pseudo-randomly determined time period.

18. The computer program product of claim 17, wherein the computer readable program further causes the computing device to generate the travel path to be traversed by the unmanned vehicle using a function that randomizes generation of the travel path at least by randomly or pseudo-randomly selecting the travel path from a set of predefined travel paths, and wherein the computer readable program further causes the computing device to:
store, for the unmanned vehicle, a history of travel paths previously assigned to the unmanned vehicle; and
prune the set of predefined travel paths based on the history of travel paths so as to remove travel paths previously assigned to the unmanned vehicle from the set of travel paths prior to selecting the travel path from the set of predefined travel paths.

19. An apparatus comprising:
a processor; and
a memory coupled to the processor, wherein the memory comprises instructions which, when executed by the processor, cause the processor to:
identify an area to be monitored by an unmanned vehicle;
identify an unmanned vehicle assigned to monitoring the identified area;
generate, for the unmanned vehicle, a travel path to be traversed by the unmanned vehicle using a function that randomizes generation of the travel path;
program the unmanned vehicle to traverse the generated travel path;
initiate operation of the unmanned vehicle to collect data about the area while traversing the generated travel path;
monitor the area utilizing the unmanned vehicle based on the data collected by the unmanned vehicle while traversing the generated travel path;
generate a new travel path to be traversed by the unmanned vehicle using the function or a different function that randomizes generating of the travel path; and
in response to generating the new travel path, re-reprogram the unmanned vehicle to traverse the new travel path, wherein, in response to the re-programming of the unmanned vehicle, the unmanned vehicle moves to a closest position of the new travel path from a current position of the unmanned vehicle and begins traversing the new travel path, and wherein the new travel path is generated in response to an elapse of a randomly or pseudo-randomly determined time period.

20. The apparatus of claim 19, wherein the instructions further cause the processor to generate the travel path to be traversed by the unmanned vehicle using a function that randomizes generation of the travel path at least by randomly or pseudo-randomly selecting the travel path from a set of predefined travel paths, and wherein the instructions further cause the processor to:
store, for the unmanned vehicle, a history of travel paths previously assigned to the unmanned vehicle; and
prune the set of predefined travel paths based on the history of travel paths so as to remove travel paths previously assigned to the unmanned vehicle from the set of travel paths prior to selecting the travel path from the set of predefined travel paths.

\* \* \* \* \*